Figure 1:
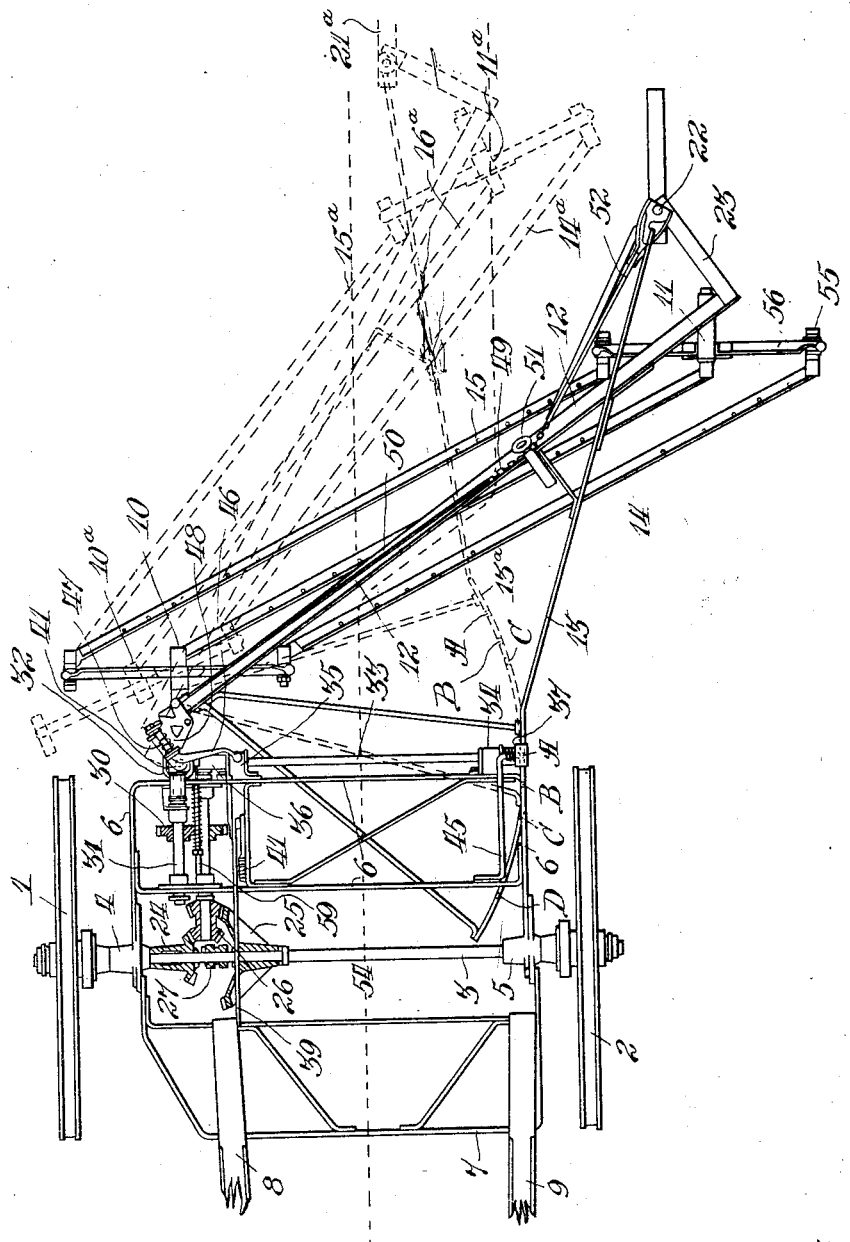

Oct. 9, 1928.
P. RANDALL
1,687,310
SIDE DELIVERY RAKE AND SWATH TURNER
Filed Sept. 28, 1927
3 Sheets-Sheet 2

Inventor.
Parke Randall.
By W.P. Doolittle
Atty.

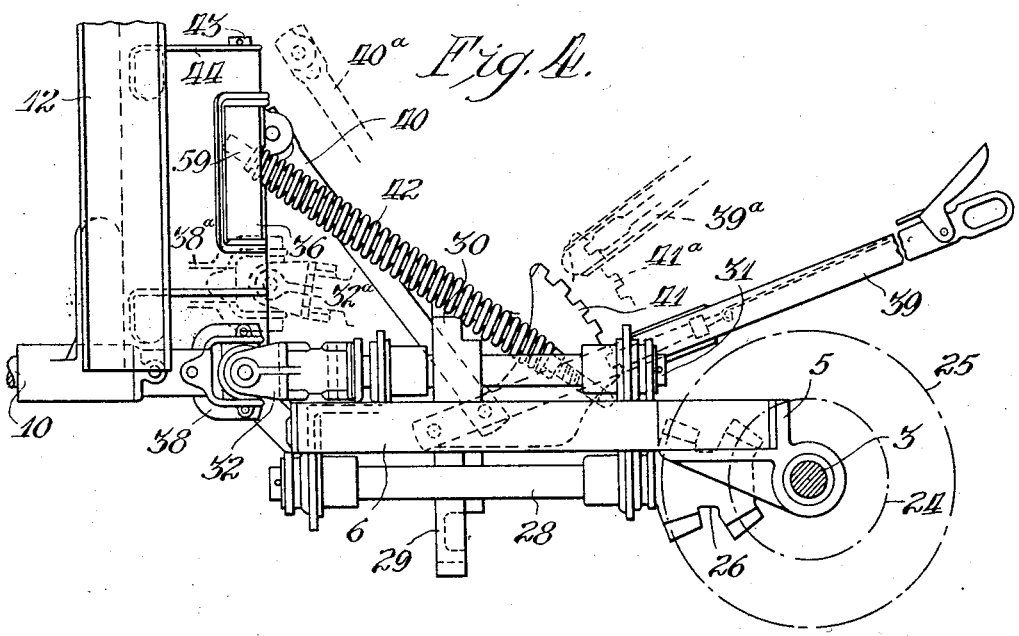

Patented Oct. 9, 1928.

1,687,310

UNITED STATES PATENT OFFICE.

PARKE RANDALL, OF LILLE, FRANCE, ASSIGNOR TO INTERNATIONAL HARVESTER COMPANY, A CORPORATION OF NEW JERSEY.

SIDE-DELIVERY RAKE AND SWATH TURNER.

Application filed September 28, 1927, Serial No. 222,478, and in Germany August 5, 1926.

This invention relates to side-delivery hay-rakes of the type having the essentially horizontal rake-bars fastened on two revolving heads, for instance, cylinder-discs or cylinder-spiders, in such a manner that the rake-teeth always hang vertically. The rake-bars are arranged obliquely to the line of travel, so that the swath is operated upon in an angular manner.

Such a side-delivery rake is convertible into a tedder by reversing the direction of rotation of the rake-bars, at the same time engaging in a greater speed. If a portion of the teeth be removed from the center in each rake-bar, then such a side-delivery rake can also be used as a swath-turner. In this case, the direction of rotation of the rake-bars is not important, as the remaining rake-teeth form two so-called revolving drums which turn two swaths.

It is known that, with machines of the types described, great difficulty is experienced in arranging the so-called working height of the rake-bars in such a manner that all individual working operations can be done with the necessary precise adaptability to the different conditions; and furthermore that the rake can be raised sufficiently high in order to be transported without difficulty over very uneven ground. The accomplishment of this task necessitates a considerable height adjustment of the rake at the inner end, towards the truck, as well as at the outer end, to the rear of the truck. With most machines of this type, the adjustment of the rake at the inner end is very limited, can only be carried out with extreme difficulty, and by the use of tools.

With machines of the described type hitherto known, it is moreover impossible to transport the machine along narrow roads and through narrow thoroughfares, for instance, gateways or the like, on account of the width of the rake being too great. Finally, a special disadvantage exists in the fact that, in using the known side-delivery rakes of the type referred to as swath-turners, the two groups of rake-teeth or revolving drums, retained in connection with the revolving heads, remain at an unchangeable distance apart, so that it is impossible to adequately adapt same to all widths of swaths.

One object of the present invention is to provide a side-delivery cylinder hay-rake which can be converted into a swath-turner and tedder and in which the rake can be moved at all times conveniently and without the use of tools in the plane determined by the main axle of the truck, as well as in a plane vertical to that plane. A further object is to provide for the adjustment of the height of the part of the rake towards the truck, as well as of the part to the rear of the truck, such adjustment being effected in every sidewards position from the operator's seat as well as from the ground. Besides this, the adjustment of the one end of the rake is totally independent of the adjustment of its other end.

The invention embraces moreover a special arrangement of the gears, in order to have the rake-driving shaft on a high level without the use of specially large road-wheels; and finally, it includes a specially adapted bearing for the turning pivots of the rake-bars in their supporting revolving heads.

With the object hereinafter mentioned, the rake is tiltably suspended on a shaft running parallel to the main axle connecting the road-wheels and arranged to the rear of the truck, so that its centre line intersects with the intersecting point of the shaft—on which the rake is pivoted—through the revolving heads in which the rake-bars terminate with revolvable pivots. In this intersecting point of the center lines, the center of the universal joint, or other equal means, is placed; these parts being indispensable for the transmission of the rotary motion from the driving shaft to the rake-driving shaft. In this manner, the rake is swingable in the plane vertical to the plane through the center lines of the main axle and the tilting shaft. The entirety of the tiltable rake-frame with rake together with the entirety of the truck forms a bent lever-like shape with the tilting shaft as the hinge joint.

The machine is further characterized by the entirety of the rake-frame with the rake being pivoted on a shaft at right angles to the tilting shaft, which latter is so arranged that its center line also intersects with the center point of the universal joint. In general, this pivot shaft, which is preferably vertical, projects from the tilting shaft upwards; but without deviating from the nature of the invention, it can extend downwards from the tilting shaft. The entire rake-frame can perform a circular movement around this pivot shaft, whereby the width of the machine can be adjusted at will within limits which relatively lie far apart. The narrow limit is generally determined by the width of the truck measured over the wheel-hubs. The wide limit is determined by the largest working width necessary, which, in consideration of the working conditions generally prevailing, far surpasses the width of the truck.

In the narrow working width, the machine can therefore be transported without difficulty along such narrow roadways, or through such narrow gateways, as will just permit of the truck, the width of which undergoes no change, passing through. In the wide working width, the machine can take care of the maximum working conditions. As moreover the rake-frame with rake can be adjusted and set within the limits determined by the narrow and the wide working widths, the machine can be adapted to meet special requirements of working width. In order to operate the machine safely in every possible position of the rake-frame, the latter is provided with a locking device which is fitted on the end of the tilting shaft on the truck, and can be secured at the required point.

In order to be able at all times to obtain the desired height adjustment of the rake-frame, and totally independent of its respective working width, the machine is so constructed that from two points, namely, from the seat and from the ground, conveniently within reach of the operator, the so-called inner end of the rake can, independently of its outer end, be raised or lowered. For this purpose, the truck is movably connected with the adjacent part of the rake-frame by means of a rod-connection, whereof the hand-lever is swingably arranged on the truck and is secured in various positions with the aid of a notched quadrant. The handle of this lever is at all times in such a position that it can be conveniently manipulated from the operator's seat as well as from the ground. The rod-connection on the other end is attached to the so-called inner end of the rake-frame in such a manner that this part is raised or lowered with the movement of the hand-lever. With these movements, the angle formed on the vertical plane by the projections of the center lines of the driving shaft and the centers of the rake-revolving heads is changed, this angle being always obtuse. One limit for the position of the machine is determined when the center line of the driving shaft lies in the plane of the centers of the rake-revolving heads, as this position adjusts the machine to the maximum length. With all other positions of the hand-lever and rod connecting the truck with the inner end of the rake-frame, the length of the machine, measured in the vertical plane, is smaller than in the before mentioned limit position, while the inner end of the rake can be higher, as well as lower, than in the limit position. Generally, only one height adjustment of the inner part of the rake will come into consideration, as ordinarily one aims to place the revolving shaft of the rake as high as possible. This high center of the rake driving shaft is of special importance, and up to the present has been attained by using a vertical driving shaft, or at least a greatly inclined driving shaft, which transmitted the rotary motion by means of special gears; for instance, groups of bevel gears or a chain-gear. Experience has proved that the use of such special driving means, with steep upright driving shafts and an essentially horizontal rake-shaft, is attended with great disadvantage.

The machine the subject of the present invention is free from such disadvantage, inasmuch as the driving shaft is placed on a higher level from the outset, and is not directly coupled with the main axle carrying the road-wheels of the truck. Between the road-wheel axle and the main driving shaft is inserted an intermediate shaft, the latter being arranged below, but parallel with, the driving shaft and coupled thereto by means of spur gear. Between the main axle and the intermediate shaft, an alternative-drive bevel gear is provided, same having two or more ratios, and suitable means for clutching and declutching. In this manner, the universal joint, transmitting the rotary motion from the driving shaft to the rake-driving shaft, is centered very high, so that the use of specially large road-wheels is not necessary, and an excessive angle to the universal joint drive is thereby avoided. This is of distinct importance, because large road-wheels would prevent the machine being made in a compact form.

According to my improved method of construction, not only is the inner end of the rake-frame raised or lowered independently of the width, but an equal independent height adjustment is also obtainable at the outer end of the rake-frame. This outer end of the rake-frame is supported in the known manner by a caster-wheel by means of an upright standard. The rear end of the rake-frame is arranged slidingly along this upright standard of the caster-wheel, and between the rake-frame and the upper end of the standard is inserted a lever arrangement by means of which a raising or lowering of the rake-frame, in relation to the standard of the caster-wheel, is effected. The position of the rake-frame in regard to the caster-wheel is determined by the amount of pull, the point of which starts at the lever which is linked to the upper end of the standard in a plane through the center line of same. In order to be able at all times to conveniently raise and lower the end of the rake-frame (with rake) to the rear of the truck, a raising gear (worm and sector device) is arranged at the front end of the rake-frame towards the truck and in such a manner that the operating crank is conveniently within reach from the operator's seat, as well as from the ground. Between the adjusting lever linked to the standard of the caster-wheel and the moving parts of the raising gear, pull-rods or cables are inserted. To absorb some of the shocks transmitted from the caster-wheel and its standard to the rake-frame a tension spring can be inserted at some point in the pull-rods if deemed necessary or desirable.

The improved machine is therefore characterized by the employment of the rake-driving shaft, notwithstanding the employment of comparatively small road-wheels, being centered on a high level; and that, independently of the different width positions of the rake, it can be tilted at will within wide limits. In this way, the machine, when working, is easily and quickly adapted to all working and ground conditions. It can also be folded or narrowed for transport purposes.

Such a machine puts a great strain on the bearings of the rake-bars. In order to ensure easy working in every position, the rake-bars or their supporting pivots must be prevented from binding or cramping. With the unusual adjustments of the rake-frame, and therefore also of the rake, the avoidance of this tendency entails the employment of special means for the bearings of the supporting pivots of the rake-bars.

Every supporting pivot of the rake-bar rests in a bearing which, movable to a certain extent, is held within the arms of a forked bracket fastened to the arms of the revolving heads, and is secured by a pin or bolt, preferably in the center of the bearing box and at the outer edge thereof. By virtue of this arrangement, the rake-bars acquire great freedom of movement, so that while the teeth always hang downwards properly, in every width position of the rake, cramping is prevented.

Figure 2:
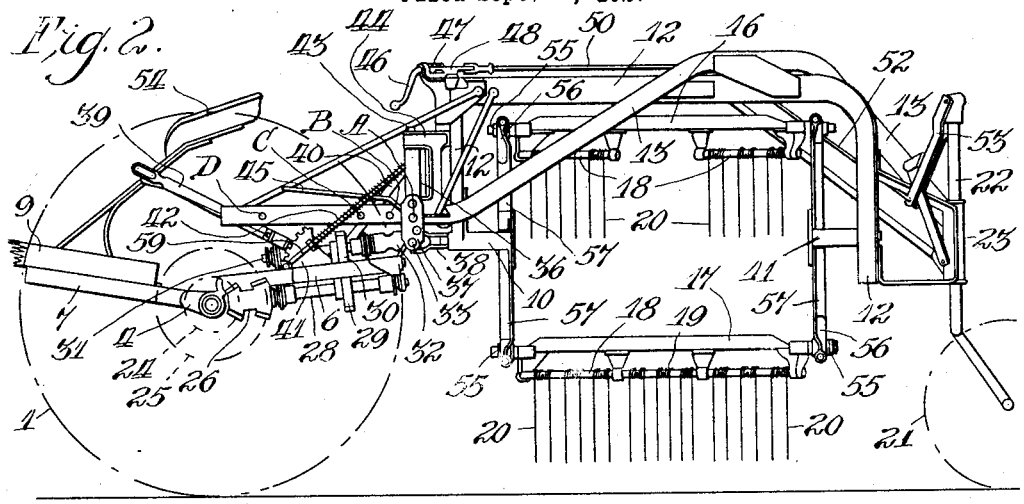
Figure 3:
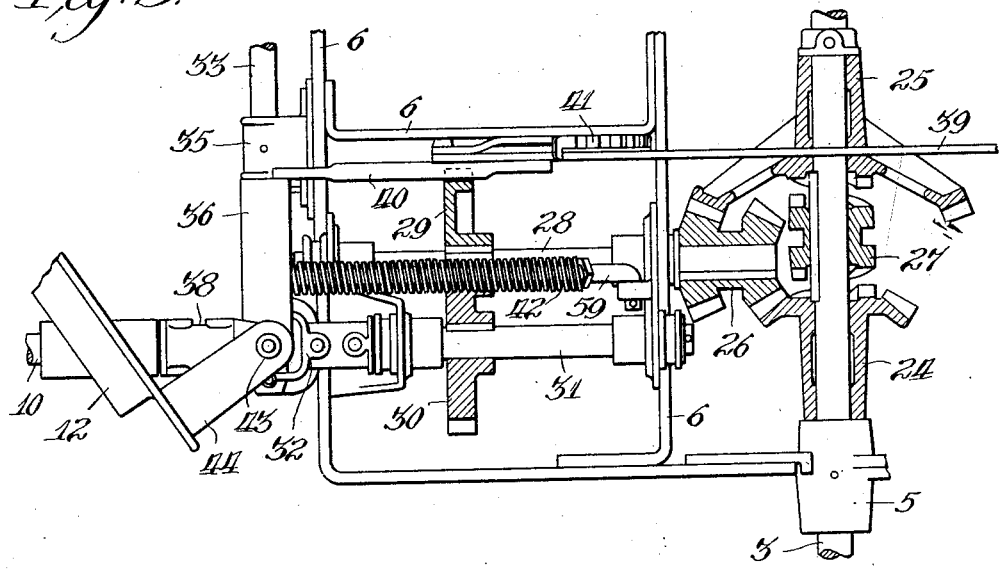

One mode of carrying the invention into effect is illustrated in the accompanying drawings, whereof Fig. 1 is a plan view of a side-delivery hay-rake, the driving gear being shown in section; Fig. 2 is a side elevation; Fig. 3 a horizontal section of the driving gear on a larger scale; Fig. 4 a side view taken on the opposite side of the left hand portion of Fig. 2, but on a larger scale; and Figs. 5 and 6 show details hereinafter particularly referred to.

The road-wheels 1 and 2 are mounted on the main axle 3, which in turn is mounted in the bearings 4 and 5. These bearings, with the draw-frame 7 of the truck, are fastened on the gear-frame 6 of the truck. The pulling shafts 8 and 9 are connected with the draw-frame 7 in the usual manner. The revolving heads 10 and 11 of the rake (four-armed revolving spiders in the present instance) are supported by the rake-frame, the principal members of which bear the numerals 12 and 13. The revolving heads 10, 11, which may also be constructed as cylinder discs, support four rake-bars 14, 15, 16 and 17, to which, by means of a number of brackets, pipes or pipe-pieces, 18, are fastened to the centre part 19, which is detachable with a view to enabling the hanging-down rake-teeth 20, fastened to these pipe-pieces, to be removed from the center of the rake.

The so-called outer part of the rake-frame at the rear of the truck is supported by a caster-wheel 21 mounted on an upright standard 22, the arrangement being such that the bracket 23 can slide upon the standard 22.

The driving gears are illustrated in Figs. 1 and 2, but will be more readily understood on reference to Figs. 3 and 4. Free to rotate on the main axle 3 are two bevel gears 24 and 25 with different tooth ratios and arranged face to face. With these bevel gears 24 and 25, the double pinion 26 meshes according to the position occupied by the hand-operated clutch 27, which slides on a feather on the main axle 3. When the machine is used as a rake, the bevel wheel 24 is in gear; but when required to operate as a tedder, the clutch part 27 is released from the bevel wheel 24 and engaged with the bevel wheel 25. The double pinion 26 is keyed upon the intermediate shaft 28, the latter revolving in two bearings attached to the frame 6 of the truck. Upon the shaft 28 is also keyed a spur-gear 29 which meshes with a spur-gear 30 keyed upon the driving shaft 31, this shaft also rotating in bearings attached to the frame 6. To the rear extremity of the shaft 31 is secured the driving member 32 of a universal joint.

In bearings 34, 35, arranged on the rear portion of the truck-frame 6, is mounted a tilting shaft 33, to the end of which, towards the gear, a hinge-like bracket 36 is secured; whilst at the opposite end of the tilting shaft 33 is a locking bracket 37. The center line of the tilting shaft 33 intersects with the center point of the universal joint, whereof the one part 32 is connected with the driving shaft 31, whilst the other part 38 is connected with the rake-driving head or shaft 10.

The hinge-bracket 36, secured to the tilting shaft 33, is in connection with an adjustable hand-lever 39 by means of a rod 40 linked to both parts. This hand-lever can be set within its limits at will with the aid of a notched quadrant 41 fastened to the frame of the truck 6. Between the truck and the hinge-bracket is a spiral spring 42, arranged about a spring-rod 59, to afford assistance in raising the rake-frame. The rod 59 is free to slide at its upper end through the hinge-bracket 36.

The hinge-bracket 36 embodies an upright hinge-shaft 43 to which the frame 12 of the rake-frame is connected by means of a bracket 44. The center line of the hinge-shaft 43, like that of the tilting shaft 33, intersects with the center of the universal joint consisting of the parts 32 and 38. By this arrangement, the entire rake-frame can be tilted on the shaft 33 or can be swung around the shaft 43 at will, thereby permitting the rake to assume various angular positions without interfering in any way with the transmission of the rotary motion from the driving shaft 31 to the rake-driving shaft 10.

A portion of the rake-frame 13 is semi-circular in form, this portion resting in the locking bracket 37. This semi-circular part of the brace 13 has a number of holes A, B, C, D, any one of which can be brought into alignment with a corresponding hole in the frame-lock 37 (Fig. 1). The locking lever 45, held in position by means of a spring, permits of the rake-frame being secured within the limits set by the holes A—D.

The working width of the rake is determined hereby. The maximum width of the machine is shown in Fig. 1 by the full lines, while the minimum working width, the so-called narrow position, is shown by the dotted lines. From Fig. 1 suitable proportions for the parts and their general arrangement will be readily gathered, the numerals attached to the parts when in the "narrow" position being distinguished by the affix "a".

The end of the rake-frame which is to the rear of the truck is raised or lowered in the example illustrated by turning the crank 46, thereby operating a worm 47 which meshes with a worm-gear sector 48. A pull-rod 50 is connected with this sector and a chain 49 runs over a sheave 51 near the rearward part of the rake-frame. From the other end of the chain 49, a similar pull-rod 52 leads to a lever 53, pivoted in the upper part of the standard 22 of the castor-wheel 21. For this arrangement, comprising several parts, there may be substituted a continuous cable fastened directly to the lever 53.

It will have been realized that the hand-lever 39, which effects the height adjustment of the end of the rake-frame towards the truck, as well as the crank 46 of raising gear 47—48, sustain only slight changes of position in all positions of the rake, and are at all times conveniently within reach of the operator's seat 54. Owing to the special arrangement of the driving mechanism whereby relatively small road-wheels are employable, the construction height of the machine is essentially diminished, and the handle of the lever 39 and the crank 46 are also at all times easily accessible from the ground.

An arrangement of limited movable bearings for the supporting pivots of the rake-bars is shown in Figs. 5 and 6, the principal parts of which are also to be seen from Figs. 1 and 2. The supporting pivots of the rake-bars 14—17 rest in bearings 55 between the arms of a forked bracket 56, which may be riveted to the revolving head, as shown, or secured to the spokes or arms 57 of the cylinder-spider. Each of the bearing boxes 55 is formed externally with a semi-circular notch at right angles to its bore, in which notch rests the stem of a cross-pin 58, said pin also passing through holes in the ends of the arms of the forked bracket 56. The bearing boxes 55 are, under such conditions, affording freedom for movement thereby within certain limits, avoiding the risk of binding or cramping the action of the rake-bars 14—17.

Having now particularly described and ascertained the nature of my said invention and in what manner the same is to be performed, I claim:

1. In a combined side delivery rake and tedder, the combination of a transverse axle, an obliquely arranged rake shaft, a shaft about which the rake may be tilted, said shaft being in parallelism with the axle and having its axis intersecting the axis of the oblique rake shaft.

2. In a combined side delivery rake and tedder, the combination of a laterally folding rake frame, an upright shaft about which this folding movement takes place, and a transverse shaft on which said frame may be tilted up or down, the axes of the upright and transverse shafts intersecting.

3. In a combined side delivery rake and tedder, the combination of an axle, a rake including a shaft, means for driving the rake shaft, said means including gearing on the axle for driving a counter-shaft, and intermediate shaft above and driven from the counter-shaft, a universal joint connecting the intermediate shaft to the rake shaft, and a clutch for controlling the gearing.

4. In a rake, a main frame, a transverse shaft on the frame, a rake frame tiltable up and down about said shaft, an upright shaft about which the rake frame is transversely foldable, and an oblique rake driving shaft included in the rake, the axes of all three shafts intersecting.

In testimony whereof I affix my signature.

PARKE RANDALL.